United States Patent
Hui et al.

(10) Patent No.: US 9,071,533 B2
(45) Date of Patent: Jun. 30, 2015

(54) MULTICAST GROUP ASSIGNMENT USING PROBABILISTIC APPROXIMATIONS

(75) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 169 days.

(21) Appl. No.: 13/563,185

(22) Filed: Jul. 31, 2012

(65) Prior Publication Data

US 2014/0036912 A1 Feb. 6, 2014

(51) Int. Cl.
*H04W 4/00* (2009.01)
*H04L 12/721* (2013.01)
*H04L 12/761* (2013.01)
*H04W 40/02* (2009.01)
*H04W 40/28* (2009.01)
*H04L 12/743* (2013.01)

(52) U.S. Cl.
CPC ............... *H04L 45/14* (2013.01); *H04W 40/02* (2013.01); *H04W 40/023* (2013.01); *H04W 40/28* (2013.01); *H04L 45/7453* (2013.01); *H04L 45/16* (2013.01)

(58) Field of Classification Search
CPC ... H04W 40/02; H04W 40/023; H04W 40/24; H04W 40/244; H04W 40/246; H04W 40/248; H04W 40/32
USPC .................. 370/255–256, 312, 389, 390, 392
See application file for complete search history.

(56) References Cited

U.S. PATENT DOCUMENTS

| | | | |
|---|---|---|---|
| 7,369,557 B1 | 5/2008 | Sinha | |
| 8,032,529 B2 | 10/2011 | Gupta et al. | |
| 8,108,713 B2 | 1/2012 | Turner et al. | |
| 8,271,687 B2 | 9/2012 | Turner et al. | |
| 8,345,682 B2 | 1/2013 | Pignataro et al. | |
| 8,381,024 B2 | 2/2013 | Turner et al. | |
| 8,792,360 B2 * | 7/2014 | Herberg et al. | 370/242 |
| 8,938,469 B1 * | 1/2015 | Keen et al. | 707/769 |
| 2003/0026268 A1 * | 2/2003 | Navas | 370/400 |
| 2003/0115485 A1 * | 6/2003 | Milliken | 713/201 |
| 2004/0091116 A1 * | 5/2004 | Staddon et al. | 380/277 |
| 2007/0288387 A1 * | 12/2007 | Park et al. | 705/59 |
| 2008/0002599 A1 * | 1/2008 | Yau et al. | 370/310 |
| 2009/0016255 A1 * | 1/2009 | Park | 370/312 |

(Continued)

OTHER PUBLICATIONS

Winter, et al., "RPL: IPv6 Routing Protocol for Low-Power and Lossy Networks", IETF Request for Comments 6550, Mar. 2012, 158 pages.

(Continued)

*Primary Examiner* — Farah Faroul
(74) *Attorney, Agent, or Firm* — Parker Ibrahim & Berg LLC; James M. Behmke; Stephen D. LeBarron

(57) ABSTRACT

In one embodiment, a source node (e.g., responsible node) determines a plurality of destination nodes of a message, and generates a probabilistic data structure that encodes each of the plurality of destination nodes without any false negatives and with zero or more false positives. The source node may then transmit the message with the probabilistic data structure toward the plurality of destination nodes, wherein nodes receiving the message interpret the probabilistic data structure to determine whether the receiving node is probabilistically one of the intended plurality of destination nodes.

23 Claims, 6 Drawing Sheets

(56) References Cited

U.S. PATENT DOCUMENTS

| | | | |
|---|---|---|---|
| 2009/0216910 A1* | 8/2009 | Duchesneau | 709/250 |
| 2010/0161523 A1 | 6/2010 | Li et al. | |
| 2010/0318795 A1* | 12/2010 | Haddad et al. | 713/168 |
| 2011/0149973 A1* | 6/2011 | Esteve Rothenberg et al. | 370/392 |
| 2011/0202761 A1* | 8/2011 | Sarela et al. | 713/163 |
| 2012/0047223 A1* | 2/2012 | Tarkoma | 709/217 |
| 2012/0047284 A1* | 2/2012 | Tarkoma | 709/247 |
| 2012/0076005 A1* | 3/2012 | Li et al. | 370/248 |
| 2012/0311686 A1* | 12/2012 | Medina et al. | 726/7 |
| 2013/0111038 A1* | 5/2013 | Girard | 709/226 |
| 2013/0185445 A1* | 7/2013 | Larkin | 709/228 |
| 2013/0262366 A1* | 10/2013 | Hjelm et al. | 706/50 |
| 2013/0318051 A1* | 11/2013 | Kumar et al. | 707/692 |
| 2014/0036908 A1* | 2/2014 | Hui et al. | 370/389 |

OTHER PUBLICATIONS

Lin, et al., "TypeCast: Type-Based Routing in Wireless Ad-hoc Networks", Third Annual International Conference on Moble and Ubiquitous Systems: Networking and Services, Jul. 2006, 10 pages, IEEE, San Jose, CA.

Pozzi, et al., "Notification of Transmittal of the International Search Report and the Written Opinion of the International Searching Authority, or the Declaration", Patent Cooperation Treaty, International Application No. PCT/US2013/052553, mailed Nov. 18, 2013, 12 pages, European Patent Office, Rijswijk, Netherlands.

Ratnasamy, et al., "Revisiting IP Multicast", Proceedings of the 2006 Conference on Applications, Technologies, Architectures, and Protocols for Computer Communications, SIGCOMM '06, Jan. 2006, pp. 15-26, New York, New York.

Tian, et al., "Loop Mitigation in Bloom Filter Based Multicast: A Destination-Oriented Approach", Proceedings INFOCOM, Mar. 2012, pp. 2131-2139, IEEE.

* cited by examiner

MULTICAST GROUP ASSIGNMENT USING PROBABILISTIC APPROXIMATIONS

TECHNICAL FIELD

The present disclosure relates generally to computer networks, and, more particularly, to multicast group assignments.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Dynamic multicast group communication is a challenging problem in LLNs, as well as in other types of networks. In particular, creating/removing groups and managing the group membership can be a costly operation.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
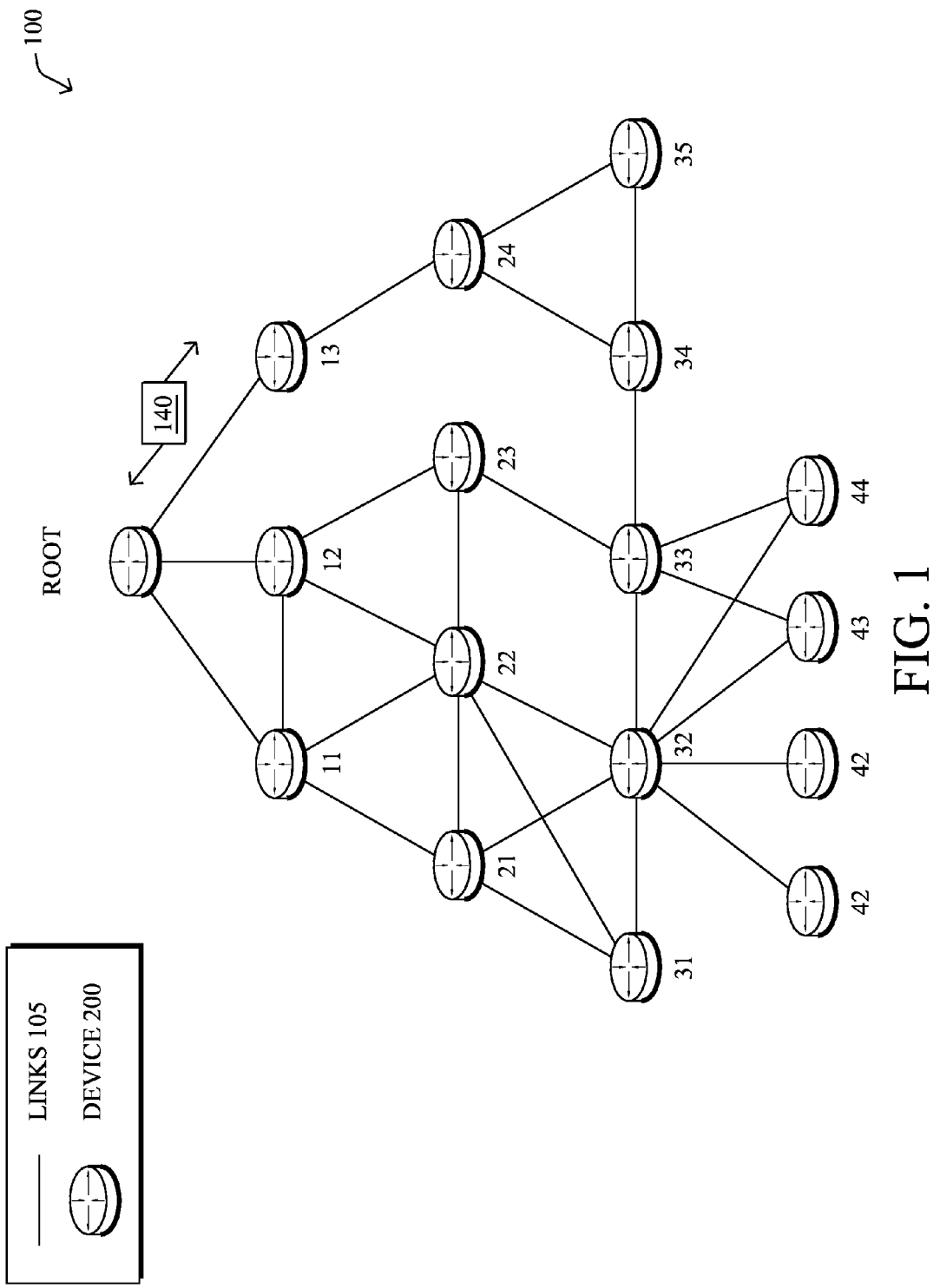
FIG. 1 illustrates an example computer network.

According to one or more embodiments of the disclosure, a source node (e.g., responsible node) determines a plurality of destination nodes of a message, and generates a probabilistic data structure that encodes each of the plurality of destination nodes without any false negatives and with zero or more false positives. The source node may then transmit the message with the probabilistic data structure toward the plurality of destination nodes, wherein nodes receiving the message interpret the probabilistic data structure to determine whether the receiving node is probabilistically one of the intended plurality of destination nodes.

According to one or more additional embodiments of the disclosure, a receiving node receives a message having a probabilistic data structure that encodes each of a plurality of destination nodes without any false negatives and with zero or more false positives. The receiving node may then interpret the probabilistic data structure to determine whether the receiving node is probabilistically one of the intended plurality of destination nodes. In response to the receiving node being probabilistically one of the intended plurality of destination nodes, performing an action on the message as dictated by the message as an intended destination node. In response to the receiving node not being one of the intended plurality of destination nodes, managing the message as dictated by the message as a node other than an intended destination node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," ... "44," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
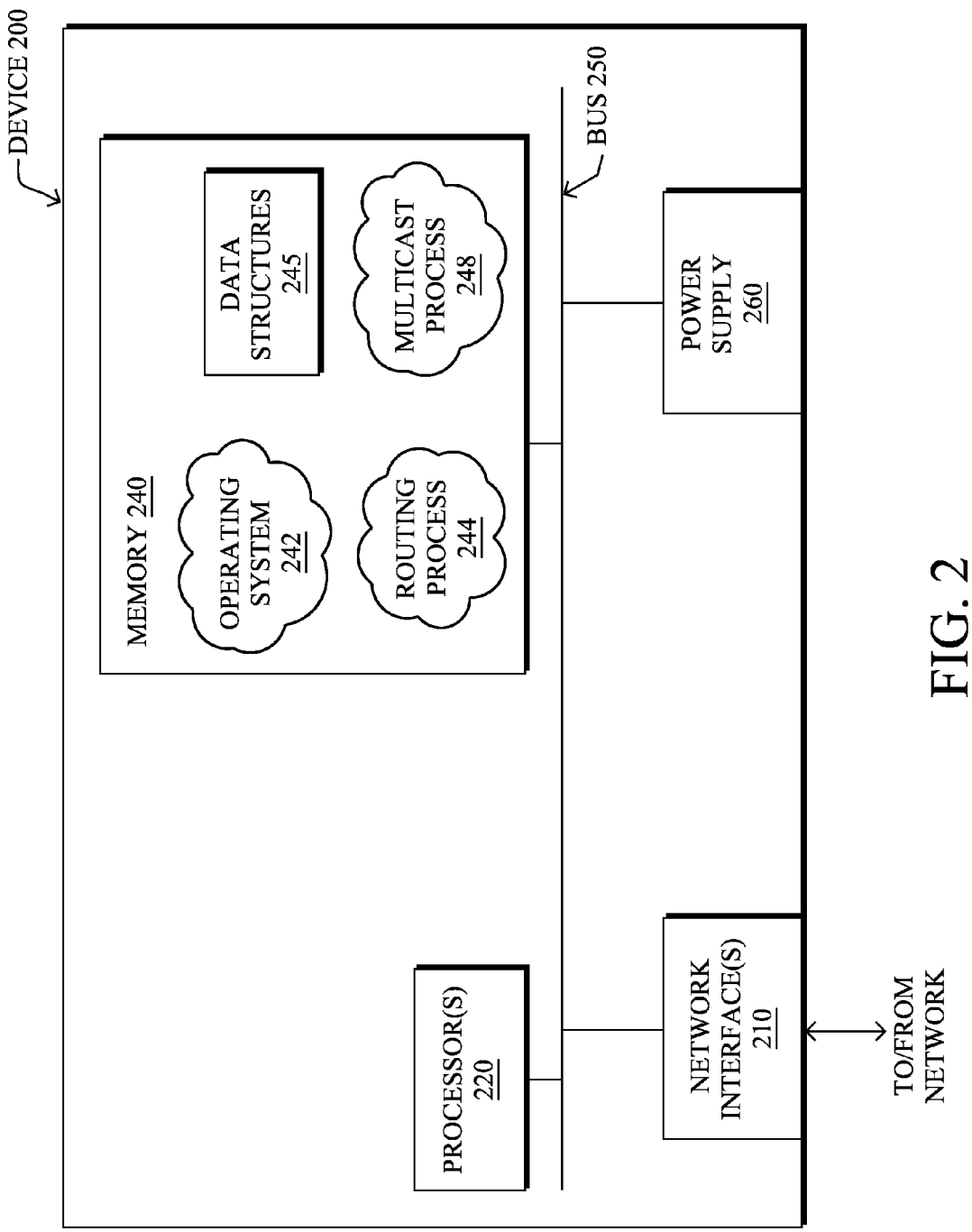
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative multicast process 248, as described herein. Note that while multicast process 248 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

As noted above, dynamic multicast group communication is a challenging problem in LLNs, as well as in other types of networks. In particular, creating/removing groups and managing the group membership can be a costly operation. One solution is to create a new multicast group identifier and notify those nodes that they should subscribe to the group. When changing the group membership, adding nodes requires notifying those nodes to subscribe to the group while removing nodes requires notifying those nodes to unsubscribe from the group. The advantage of this approach is that a single, compact group identifier may be used to address all nodes within the group. However, the need to notify individual nodes to (un)subscribe incurs significant control message overhead.

Another solution is to enumerate all intended receivers within the multicast message itself. The advantage of this approach is that there is no additional control overhead to manage the group membership. However, the packet overhead grows significantly with the number of nodes in the group. For example, when using IPv6 addresses, even listing just 10 receivers requires 160 bytes, which is very costly given the typical constraints of LLNs. Such an approach is simply not practical.

In many cases, the multicast group identifier or list needs to deterministically identify the set of nodes within the group to ensure that the message is not delivered to the wrong receivers. However, there are some multicast applications where it is acceptable to deliver the multicast message to a small number of unintended receivers or to a slightly larger number of recipients than needed.

One such example is in proactive routing protocols, such as RPL. One concern with the current RPL specification is that is requires all nodes to generate DAO messages periodically or none at all. The DAO control traffic at the DAG root thus increases linearly with the number of nodes in the network. For large networks, the amount of DAO traffic can be significant. One solution is to include a list of identifiers within the DIO message to indicate what nodes should be sending DAOs. This allows the DAG root to control what nodes to maintain downward routing state for at different times. However, the challenge is that specifying any reasonable number of nodes in the DIO incurs significant overhead in itself due to the size of IPv6 addresses.

The second example is with reactive routing protocols such as AODV, DYMO, or LOAD. When an Originator is searching for a route to Target device, it floods a Route Request (RREQ) message to all nodes. When the RREQ reaches the Target device, it unicasts a RREP back to the Originator. When the Originator needs to discover routes to multiple Target devices, it must repeat this process for each Target device, which incurs high overhead. Instead, it would be much more beneficial for the Target device to send a single RREQ message and receive RREP messages back from each Target device.

Note that in these examples (proactive and reactive routing protocols), it is acceptable for the multicast message to be delivered to a small number of unintended receivers. In the case of RPL, unintended receivers may generate DAO messages when they otherwise shouldn't. Similarly, in the case of reactive routing protocols, unintended receivers may generate RREP messages when they otherwise shouldn't. Moreover, some nodes may send network management information although they were not asked to. However, as long as the message reaches all of the intended receivers and the number of unintended receivers is kept small, overall performance may be improved by removing the need to manage multicast groups, including costly node lists in the control messages, or flooding the network once per intended receiver.

A third example occurs when requesting specific information related to management (e.g., link statistics, logs, etc.). Today, there are two options to retrieve such information: (i) send a unicast request to each targeted node individually or (ii) use a dynamic multicast group. Managing multicast groups in Connected Grid NMS (CG-NMS) is a costly operation because it involves the control mechanisms described above.

Instead, the techniques herein suggest the use of a probabilistic approach to request the information from a dynamic group of nodes without control plane overhead, even if some of the nodes were not targeted and the NMS system gets more replies than necessary. Note that there are a variety of such scenarios that the NMS cannot realize today due to the lack of efficient solutions for dealing with dynamic multicast groups.

In particular, the present disclosure describes the use of a probabilistic approach for dynamic multicast group (e.g. using Bloom filters) as an approximation of the multicast group. As described above, while there are some cases where multicast groups need to ensure delivery only to the intended receivers, there are some applications where delivery to a small number of unintended receivers may be acceptable.

Because Bloom filters do not have any false negatives but may have false positives, they are well-suited to solve the routing issues described above.

Specifically, the techniques herein provide for the use of probabilistic dynamic multicast groups. This is in contrast with current approaches whereby costly signaling is used to manage multicast groups or else where a series of unicast packets are sent or the series of recipients is encoded in the packet header. To that end, the techniques herein make use of a probabilistic data structure (e.g., a Bloom filter) to address an approximation of a dynamic group of nodes. The multicast group address illustratively consists of a Bloom filter which encodes an identifier for each intended receiver. Because Bloom filters do not suffer from false negatives, all intended receivers will receive the message. However, some unintended receivers may also receive the packet due to false positives, which for many critical applications is a non issue. As described herein, the source node can manage the false positive rate by dynamically adjusting the size of the bit vector and hash functions used. Dynamic policies can be used to determine when the techniques herein are used, such as according to the expected duration of the multicast group or the number of recipients.

Illustratively, the techniques described herein may be performed by hardware, software, and/or firmware, such as in accordance with the multicast process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols or communication protocols, and as such, may be processed by similar components understood in the art that execute those protocols, accordingly.

Operationally, the techniques herein aim to provide an efficient mechanism to address dynamic multicast groups, where the group membership can change relatively frequently. As mentioned above, the techniques herein are generally focused on multicast group memberships determined by a central entity and not by the devices themselves. In the case of routing protocols, this is typically due to the DAG root or Originator nodes that are searching for one or more devices within the network to establish routes. Another case may be an NMS or off-line agent querying devices for network management related information or additional information to troubleshoot an issue.

A central component of the techniques herein consists of using a probabilistic data structure to encode dynamic multicast groups. This is in contrast to the traditional approach where group identifiers are allocated and devices must explicitly subscribe to the group identifiers. In one or more illustrative embodiments, the probabilistic data structure may be a Bloom filter. That is, a single Bloom filter contained within the packet may be used to address a probabilistic approximation of the dynamic multicast group, i.e., the Bloom filter encodes the identifier for each intended receiver of the multicast group.

Figure 3:
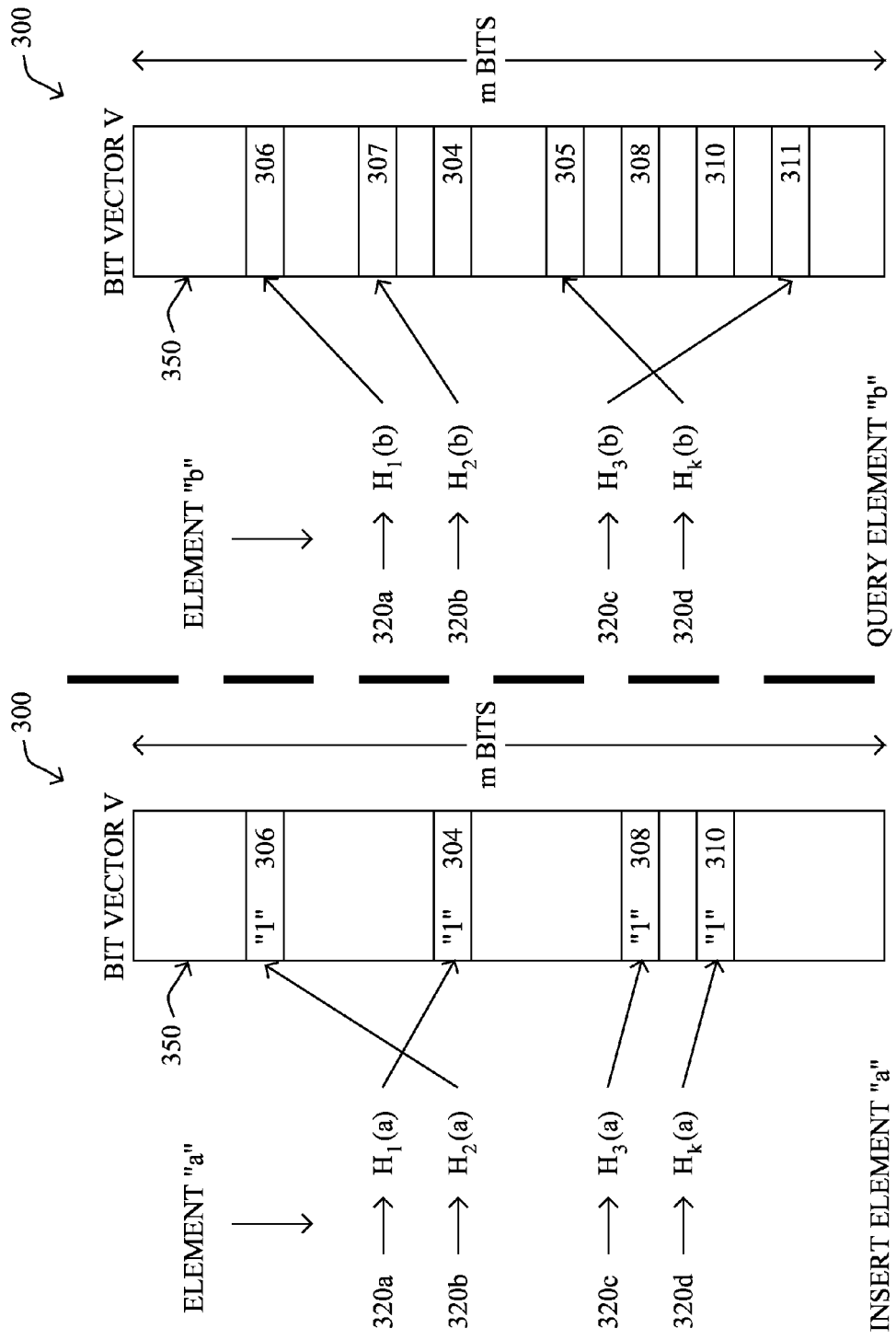
FIG. 3 illustrates an example Bloom filter.

With reference now to FIG. 3, illustrated is an example of a Bloom filter 300 with four hash functions 320a-320d. As understood by one skilled in the art, Bloom filter 300 allocates a vector v of m bits, initially all set to 0, and then choose k independent hash functions, h1, h2, . . . , hk, each with range {1, . . . , m}. Bloom filter 300 is shown implemented with a multi-ported memory 350, where the memory 350 has k ports. In this manner, the k array positions 304, 306, 308, 310 of the memory 350 may be written or queried in parallel.

The left-hand side of FIG. 3 illustrates insertion of an element (a) into a set (A). To insert an element a member A, the bits (304, 306, 308, 310, respectively) at positions h1($a$), h2($a$), . . . , hk($a$) in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

Figure 4:
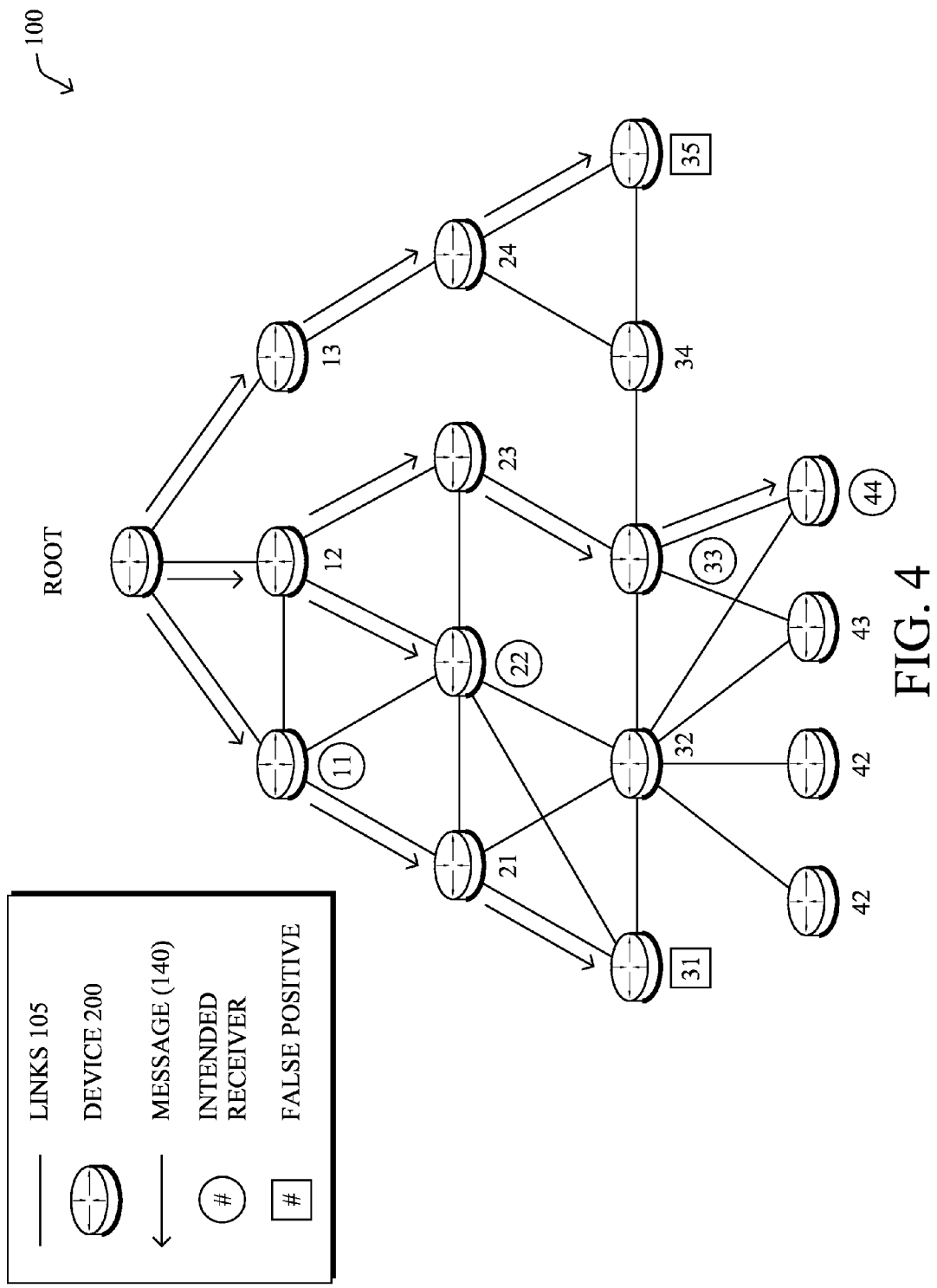
FIG. 4 illustrates an example of multicast message distribution while using a probabilistic data structure.

The right-hand side of FIG. 3 illustrates a query to determine if an element (b) is a member of the set (A). FIG. 3 illustrates that, to query for an element (to test if it is in set A), the element is fed into each of the k hash functions, resulting in k bit positions. Given a query for b, the bits (406, 407, 411, 405, respectively) at positions h1($b$), h2($b$), . . . , hk(b) are checked. Again, because the Bloom filter 400 illustrated in FIG. 4 is implemented with a k-ported memory 350, the k array positions (positions h1($b$), h2($b$), . . . , hk(b)) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

In summary, a Bloom filter is a space-efficient probabilistic data structure that is used to test whether an element is a member of a set. Typically, an empty Bloom filter is a bit-vector of m bits, all set to 0 wherein there is k different hash functions defined, each of which maps an element to one of the m array positions with a uniform random distribution. To add an element to the Bloom filter, feed it to each of the k hash functions to get k array positions and set them to 1. To test whether an element is in the set, feed it to each of the k hash functions to get k array positions. If any are 0, then the element is not in the set. If all are 1, then either the element is in the set or may indicate a false positive. Again, false positives are possible, but false negatives are not. The bit-vector size depends on the number of inserted elements and desired false positive rate. For instance, a typically Bloom filters uses 1.44*log_2(1/r) bits of space per element, where r is the false positive rate of the Bloom filter. For example, to support r<1%, the Bloom filter requires 10 bits (1.25 bytes) per element. To support r<0.1%, the Bloom filter requires 15 bits (1.875 bytes) per element.

Note that according to the techniques herein, the source node may adjust the size of the bit-vector based on the number of intended receivers and an acceptable (e.g., configured) false-positive rate. The source may adjust the false-positive rate based on other parameters, as well. For example, in the case of RPL, if the source node is willing to accept approximately X additional DAO messages, it may set the false-positive rate r=X/N, where N is the number of nodes. (Other dynamic mechanisms are provided below.)

Using a probabilistic data structure that does encodes a plurality of nodes (addresses) without any false negatives (e.g., a Bloom filter) gives an effective approximation of the intended multicast group. That is, the illustrative Bloom filter will thus properly address all of the intended receivers since Bloom filters do not generate any false negatives, and while the Bloom filter will address some unintended receivers, the number of unintended receivers may be kept probabilistically small depending on the number of bits allocated to the bit vector and the number of entries added to the Bloom filter.

In one embodiment, the Bloom filter may be encoded in an IPv6 address by reserving some portion of the IPv6 address space. However, the IPv6 address limits the Bloom filter size. When the number of entries in the Bloom filter is large or the false-positive rate needs to be very small, the IPv6 address format may not provide the flexibility required to meet those demands.

In addressing the selective DAO generation concern with RPL noted above, the techniques herein introduce a newly defined sub-TLV to be included in DIO messages. In particular, according to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. According to the techniques herein, the sub-TLV contains the Bloom filter bit vector and any necessary parameters. RPL routers receiving a DIO message with this newly defined sub-TLV then query the Bloom filter. If the query returns a positive, then the node begins generating DAO messages. If the query returns a negative, then the node stops generating DAO messages. In this way, the DAG root can control what nodes generate DAO messages. The DAG root can control the number of false positives generating DAO messages by adjusting the size the bit vector and number of hash functions to use.

In addressing the flooding concern with reactive routing protocols, the techniques herein replace the Target identifier of a route request (RREQ) message with a Bloom filter that can encode one or more Targets. The Originator then adds all Targets that it wishes to discover routes for to the Bloom filter and floods the RREQ message. Nodes receiving the RREQ message will query the Bloom filter. If the query returns a positive, then the node replies with a route reply (RREP). If the query returns a negative, then the node simply forwards the RREQ as necessary. By using a Bloom filter, the Originator can discover routes to multiple Targets by flooding a single RREQ message.

In another embodiment the techniques herein may include the TLV used to encode the Bloom filter into a newly defined IPv6 Hop-by-Hop Option header.

In yet another embodiment, the Bloom filter may be encoded in the application payload to address devices at the application layer. For example, a Constrained Application Protocol (CoAP) header may include a Bloom filter option to indicate what groups of devices should further process the CoAP payload. In another example, the CoAP payload may include an application-specific field that encapsulates the Bloom filter. Such mechanisms may be used for network management or any other arbitrary application.

FIG. 4 illustrates an example of multicast message distribution (a packet 140) while using a probabilistic data structure 410 (e.g., a Bloom filter) to relay the multicast group assignment of the message itself. In particular, assume that the multicast group consists simply of nodes 11, 22, 33, and 44. The Bloom filter used may thus probabilistically indicate those nodes, along with zero or more false positives (e.g., nodes 31 and 35).

Note that in one embodiment, the number of hash functions, k, may be encoded as an explicit field in the packet itself. In another embodiment, the number of hash functions may be implicit based on the size of the bit-vector. The packet may also identify the length of the bit-vector, but this information may be provided by the Length field of the TLV itself.

According to one or more embodiments herein, the K and r values used for the bloom filter may be dynamically adapted according to the desired percentage of false positives. For dynamic multicast groups that are not considered to be "short lived", the responsible node (e.g., root node, NMS, etc.) may dynamically adapt the value of K and r to fine tune traffic. For example, if the responsible node requires to retrieve information for troubleshooting from a set of N nodes for a few hours, and detects that it receives replies from $N'>f*N$ (e.g., $f=1.2$) then the size of k and r may be increased in order to reduce N', should the dynamic multicast group be alive for a long enough period. Note that although receiving replies from non targeted nodes may not be a problem, this would help reducing even more the traffic in the network. Thus the parameters K and r may be adjusted according to N' but also the amount of extra data generated and the network congestion state.

Note that the use of probabilistic dynamic multicast groups may be activated at various times and various locations within a computer network. For instance, the responsible node may decide to activate the use of probabilistic dynamic multicast groups for certain applications according to policy, in response to a certain number of targeted devices, an expected duration of the multicast group, etc.

Figure 5:
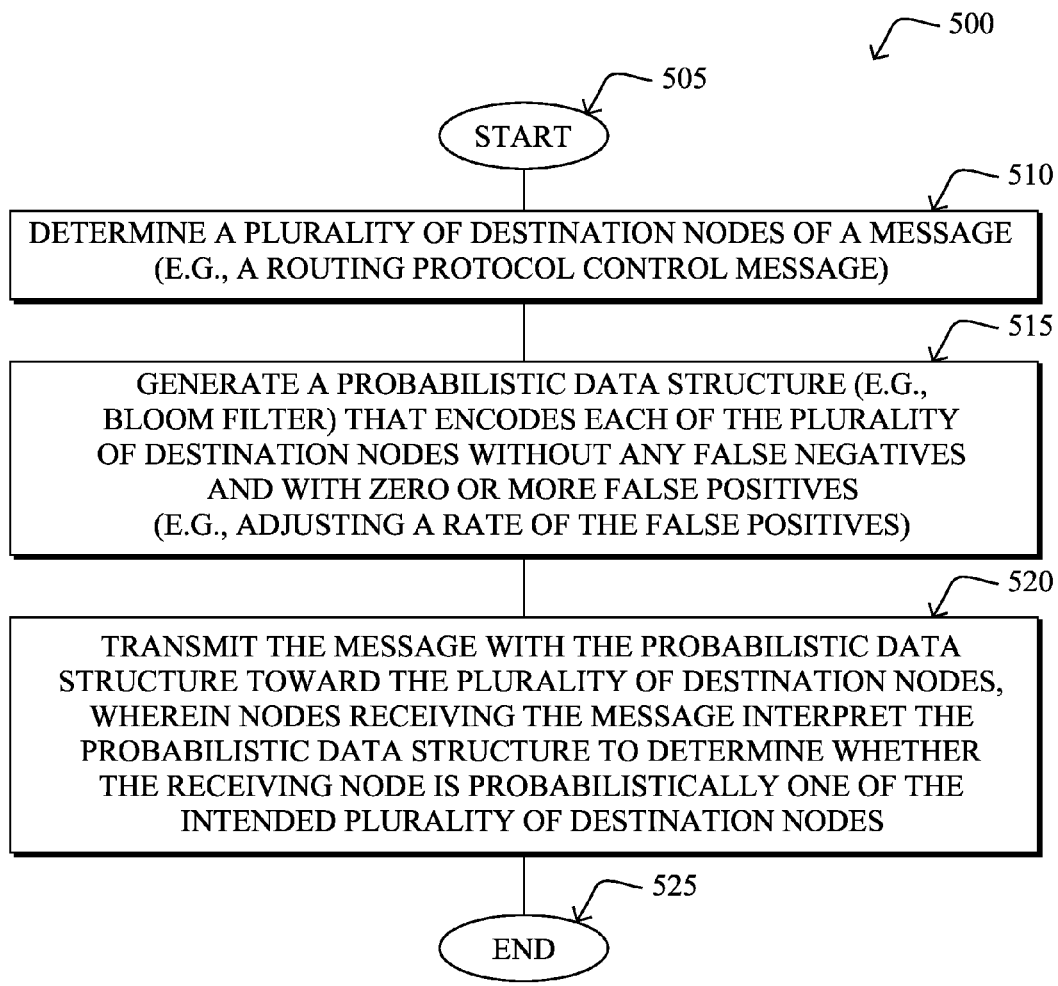
FIG. 5 illustrates an example simplified procedure for dynamic multicast group assignment using probabilistic approximations, particularly from the perspective of a source node (e.g., responsible node)

FIG. 5 illustrates an example simplified procedure 500 for dynamic multicast group assignment using probabilistic approximations in accordance with one or more embodiments described herein, particularly from the perspective of the source node (e.g., responsible node). The procedure 500 may start at step 505, and continues to step 510, where, as described in greater detail above, the source node may determine a plurality of destination nodes of a message (e.g., a routing protocol control message). In step 515, the source node (or responsible node) may then generate a probabilistic data structure (e.g., Bloom filter) that encodes each of the plurality of destination nodes without any false negatives and with zero or more false positives (e.g., adjusting a rate of the false positives), as described herein. Accordingly, in step 520, the source node transmits the message with the probabilistic data structure toward the plurality of destination nodes, wherein nodes receiving the message interpret the probabilistic data structure to determine whether the receiving node is probabilistically one of the intended plurality of destination nodes, and the procedure ends in step 525, notably with the option to send more messages in step 520 to the same set of destinations.

Figure 6:
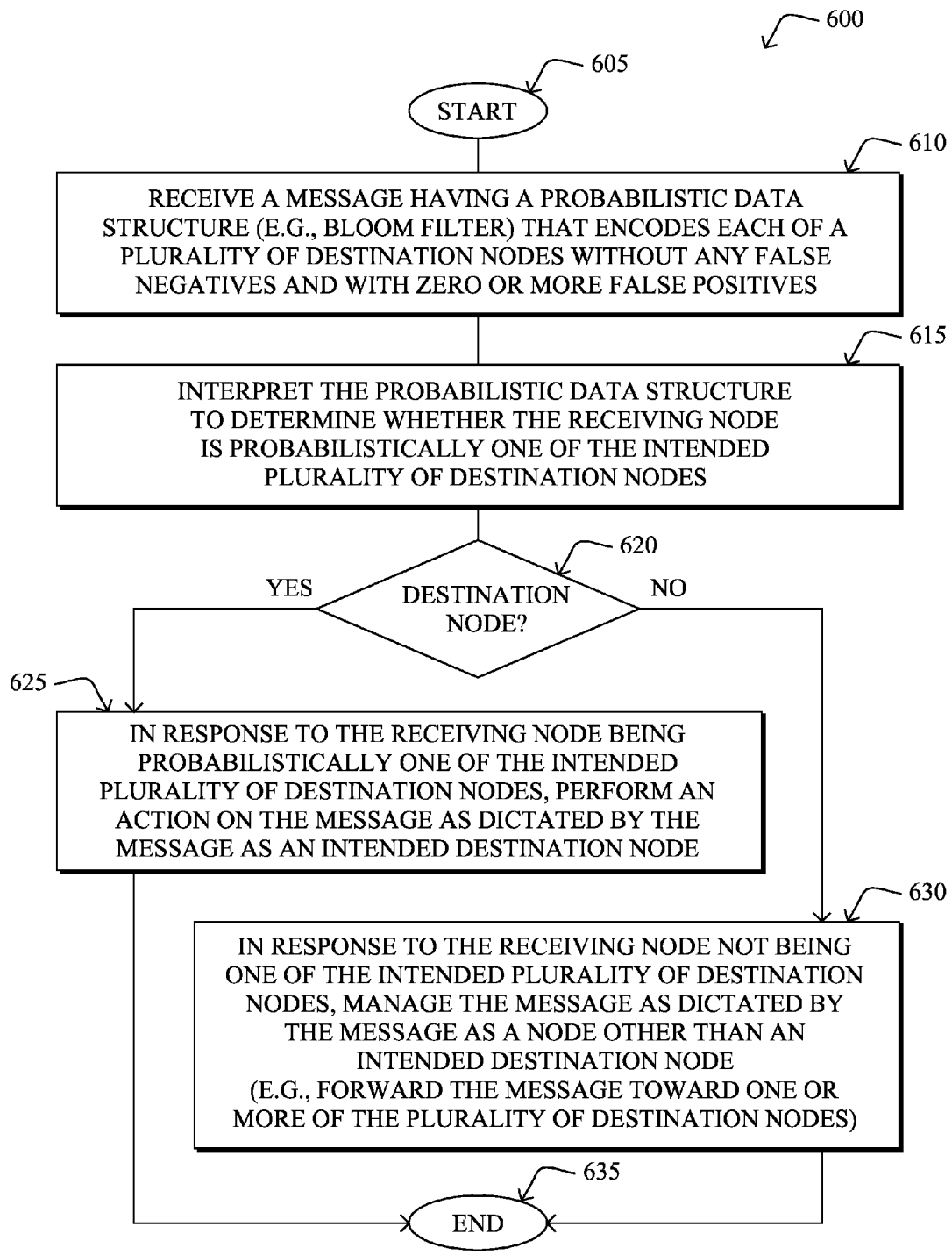
FIG. 6 illustrates another example simplified procedure for dynamic multicast group assignment using probabilistic approximations, particularly from the perspective of a receiving node.

In addition, FIG. 6 illustrates another example simplified procedure 600 for dynamic multicast group assignment using probabilistic approximations in accordance with one or more embodiments described herein, particularly from the perspective of the receiving node. The procedure 600 may start at step 605, and continues to step 610, where, as described in greater detail above, a receiving node may receive a message having a probabilistic data structure (e.g., Bloom filter) that encodes each of a plurality of destination nodes without any false negatives and with zero or more false positives. As such, the receiving node may then interpret the probabilistic data structure in step 615 to determine whether the receiving node is probabilistically one of the intended plurality of destination nodes. If the decision made in step 620 is that the receiving node is a destination node, then in step 625, in response to the receiving node being probabilistically one of the intended plurality of destination nodes, the receiving node may perform an action on the message as dictated by the message as an intended destination node. Alternatively, in response to the receiving node not being one of the intended plurality of destination nodes in step 620, then in step 630 the receiving node manages the message as dictated by the message as a node other than an intended destination node (e.g., forwarding the message toward one or more of the plurality of destination nodes). The procedure ends in step 635.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for dynamic multicast group assignment using probabilistic approximations in a computer network. In particular, the techniques herein address the challenge of managing dynamic multicast groups in LLNs (or other networks). In contrast with other existing solutions, the probabilistic approach does not require any control messaging to notify nodes of their group membership status. Furthermore, the list of members is compacted into a manageable size that can be sent efficiently over a network, such as an LLN. Using the techniques herein, network management, routing protocols, and other applications can significantly reduce their control overhead by minimizing the number of multicasts needed to discover routes to individual nodes.

While there have been shown and described illustrative embodiments that provide for dynamic multicast group assignment using probabilistic approximations, it is to be understood that various other adaptations and modifications may be made within the spirit and scope of the embodiments herein. For example, the embodiments have been shown and described herein with relation to LLNs, and particularly the RPL protocol. However, the embodiments in their broader sense are not as limited, and may, in fact, be used with other types of networks and/or protocols. Also, while the techniques generally describe initiation and determinations by a root node of a DAG, any device responsible for configuring multicast groups (e.g., NMS, head-end node, etc.) may also be used to provide intelligence to the network functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a plurality of destination nodes of a message;
   generating, on a source node, a probabilistic data structure that encodes each of the plurality of destination nodes without any false negatives and with zero or more false positives; and
   transmitting the message with the probabilistic data structure toward the plurality of destination nodes, wherein nodes receiving the message interpret the probabilistic data structure to determine whether the receiving node is probabilistically one of the intended plurality of destination nodes.

2. The method as in claim 1, wherein the probabilistic data structure is a Bloom filter.

3. The method as in claim 1, further comprising:
   adjusting a rate of the false positives.

4. The method as in claim 3, wherein adjusting comprises:
   adjusting one or both of a bit vector size of the probabilistic data structure and a hash function used to generate the probabilistic data structure.

5. The method as in claim 1, wherein the message is a routing protocol control message to solicit a routing protocol response from the plurality of destination nodes.

6. The method as in claim 5, wherein the routing protocol control message is a route request (RREQ) message to solicit route reply (RREP) messages from the plurality of destination nodes.

7. The method as in claim 5, wherein the routing protocol control message is a Destination Oriented Directed Acyclic Graph (DODAG) Information Object (DIO) message to solicit Destination Advertisement Object (DAO) messages from the plurality of destination nodes.

8. The method as in claim 1, wherein the probabilistic data structure is contained within a field within the message selected from a group consisting of: an address space of the message; a type-length-value (TLV) field of the message; a target identifier field of the message; an application header of the message; and a payload of the message.

9. A method, comprising:
   receiving, at a receiving node, a message having a probabilistic data structure that encodes each of a plurality of destination nodes without any false negatives and with zero or more false positives;
   interpreting the probabilistic data structure to determine whether the receiving node is probabilistically one of the intended plurality of destination nodes;
   in response to the receiving node being probabilistically one of the intended plurality of destination nodes, performing an action on the message as dictated by the message as an intended destination node; and
   in response to the receiving node not being one of the intended plurality of destination nodes, managing the message as dictated by the message as a node other than an intended destination node.

10. The method as in claim 9, wherein managing the message as dictated by the message as a node other than an intended destination node comprises forwarding the message toward one or more of the plurality of destination nodes.

11. The method as in claim 9, wherein the probabilistic data structure is a Bloom filter.

12. The method as in claim 9, wherein the message is a routing protocol control message to solicit a routing protocol response from the plurality of destination nodes.

13. The method as in claim 9, wherein the routing protocol control message is a route request (RREQ) message to solicit route reply (RREP) messages from the plurality of destination nodes.

14. The method as in claim 9, wherein the routing protocol control message is a Destination Oriented Directed Acyclic Graph (DODAG) Information Object (DIO) message to solicit Destination Advertisement Object (DAO) messages from the plurality of destination nodes.

15. The method as in claim 9, wherein the probabilistic data structure is contained within a field within the message selected from a group consisting of: an address space of the message; a type-length-value (TLV) field of the message; a target identifier field of the message; an application header of the message; and a payload of the message.

16. An apparatus, comprising:
one or more network interfaces to communicate within a computer network;
a processor coupled to the network interfaces and configured to execute one or more processes; and
a memory configured to store a process executable by the processor, the process when executed configured to:
determine a plurality of destination nodes of a message;
generate a probabilistic data structure that encodes each of the plurality of destination nodes without any false negatives and with zero or more false positives; and
transmit the message with the probabilistic data structure toward the plurality of destination nodes, wherein nodes receiving the message interpret the probabilistic data structure to determine whether the receiving node is probabilistically one of the intended plurality of destination nodes.

17. The apparatus as in claim 16, wherein the process when executed is further configured to:
adjust a rate of the false positives.

18. The apparatus as in claim 16, wherein the message is a routing protocol control message to solicit a routing protocol response from the plurality of destination nodes.

19. The apparatus as in claim 16, wherein the probabilistic data structure is contained within a field within the message selected from a group consisting of: an address space of the message; a type-length-value (TLV) field of the message; a target identifier field of the message; an application header of the message; and a payload of the message.

20. An apparatus, comprising:
one or more network interfaces to communicate within a computer network;
a processor coupled to the network interfaces and configured to execute one or more processes; and
a memory configured to store a process executable by the processor, the process when executed configured to:
receive, as a receiving node, a message having a probabilistic data structure that encodes each of a plurality of destination nodes without any false negatives and with zero or more false positives;
interpret the probabilistic data structure to determine whether the receiving node is probabilistically one of the intended plurality of destination nodes;
in response to the receiving node being probabilistically one of the intended plurality of destination nodes, perform an action on the message as dictated by the message as an intended destination node; and
in response to the receiving node not being one of the intended plurality of destination nodes, manage the message as dictated by the message for nodes other than an intended destination node.

21. The apparatus as in claim 20, wherein the process when executed to manage the message as dictated by the message for nodes other than an intended destination node is further configured to:
forward the message toward one or more of the plurality of destination nodes.

22. The apparatus as in claim 20, wherein the message is a routing protocol control message to solicit a routing protocol response from the plurality of destination nodes.

23. The apparatus as in claim 20, wherein the probabilistic data structure is contained within a field within the message selected from a group consisting of: an address space of the message; a type-length-value (TLV) field of the message; a target identifier field of the message; an application header of the message; and a payload of the message.

* * * * *